United States Patent
Kobayashi et al.

(10) Patent No.: US 6,282,291 B1
(45) Date of Patent: Aug. 28, 2001

(54) METHOD AND APPARATUS FOR ENCRYPTING INPUT BIT SEQUENCE

(75) Inventors: Yoshinao Kobayashi, Hiratsuka; Nobuyuki Oba, Sendai; Seiji Munetoh, Tokyo-to, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/041,380

(22) Filed: Mar. 12, 1998

(30) Foreign Application Priority Data

Mar. 13, 1997 (JP) .................................................. 9-059480

(51) Int. Cl.[7] .................................................. H04L 9/00
(52) U.S. Cl. .................................. 380/43; 380/265; 380/44
(58) Field of Search .............................. 380/43, 44, 265; 713/190

(56) References Cited

U.S. PATENT DOCUMENTS

| | | | |
|---|---|---|---|
| 4,525,599 | * 6/1985 | Curran et al. | 713/190 |
| 4,555,591 | * 11/1985 | Nash | 380/43 |
| 5,495,612 | * 2/1996 | Hirayama et al. | 709/305 |
| 5,719,819 | * 2/1998 | Maeno | 365/230.06 |
| 5,974,579 | * 1/1999 | Lepejian | 714/733 |
| 6,011,748 | * 1/2000 | Lepejian | 365/233 |

FOREIGN PATENT DOCUMENTS 63-204325 * 2/1987 (JP) .................................. G06F/7/58

* cited by examiner

*Primary Examiner*—Tod Swann
*Assistant Examiner*—Steve Kabakoff
(74) *Attorney, Agent, or Firm*—Ronald L. Drumheller

(57) ABSTRACT

An output bit sequences is derived from an initial bit sequence and this output bit sequence is used to encrypt an input bit sequence in a first mode of operation or not to so encrypt the input bit sequence in a second mode of operation. The mode of operation is switched automatically whenever the output bit sequence contains a predetermined trap bit sequence. As a result of this automatic switching between such encryption and no such encryption, unauthorized determination of secret codes is thwarted.

10 Claims, 3 Drawing Sheets

METHOD AND APPARATUS FOR ENCRYPTING INPUT BIT SEQUENCE

BACKGROUND OF THE INVENTION

1. Field of the Invention

The subject invention relates to an encrypting method and apparatus, and more particularly to a method and apparatus for encrypting a key employed for encryption and for or outputting it in the form of a plain text.

2. Related Art

An encryption system always uses a secret key. For example, an RSA (Rivest, Shamir and Adelman) system which is a public key system or a DES (Data Encryption Standard) system which is a secret key system also use an additional secret key. It is required that the secret key should not be known by other persons and that the secret key should be prevented from being stolen. Thus, when the secret key itself is stored in the ROM (Read Only Memory) of a semiconductor chip, the secret key may be possibly determined from an analysis of the chip, and therefore, this method is not desirable.

In a prior art method for solving the above mentioned problem, a secret key is formed by an LFSR (Linear Feedback Shift Register). However, the LFSR requires a number of bits corresponding to the number of bits of the secret key, so that the cost of hardware has been disadvantageously increased.

The encryption apparatus of the RSA can be also used to determine the prime number of a number. The determination of the prime number is carried out, since the secret key in the RSA method must be a prime number. In the determination of the prime number, the secret key is exposed. If one encryption apparatus is employed both for determination of a prime number and for encryption, a mode which exposed a secret key and a mode which exposed the secret key will be needed. However, if the two modes are explicitly or clearly separated, a great hint will be given to a person who tries to steal the secret key. Therefore, it is not desirable to explicitly separate the modes.

SUMMARY OF THE INVENTION

The above mentioned problems are taken into consideration, and accordingly, it is an object of the subject invention to provide a method and apparatus for implicitly performing a mode which exposed a secret key and a mode which does not expose the secret key.

It is another object to effectively thwart a person who tries to steal a secret key by using the above stated method and apparatus.

The above described objects of the subject invention can be achieved by an apparatus mentioned below. Specifically stated, the apparatus comprises a bit sequence output circuit for outputting a bit sequence which is derived from an initial bit sequence in response to the input of the initial bit sequence; a switch signal output circuit for outputting a switch signal when it is detected that the bit sequence output circuit outputs a predetermined trap bit sequence; and a switch for switching from/to a process for encrypting an input bit sequence by using the bit sequence from the bit sequence output circuit to/from a process for outputting the input bit sequence in response to the receipt of the switch signal. The bit sequence output circuit can employ the above mentioned LFSR. In this case, the number of bits does not need to be larger than that described above. Further, in this case, the switch signal output circuit may also decide whether the LFSR holds the predetermined trap bit sequence or not. Further, a similar effect can be obtained by inspecting the output bit sequence.

In addition, the implicit mode change becomes possible by enabling the selection of the initial bit sequence which causes the bit sequence output circuit to output the predetermined trap bit sequence and the initial bit sequence which causes the predetermined trap bit sequence not to be outputted. Since a person observing from the outside cannot determine time when the trap bit sequence is generated and the switch signal is output, the separation of the initial bit sequence does not indicate that the mode is explicitly switched.

Still further, after the bit sequence output circuit outputs a predetermined number of bits, an input bit sequence may be input. Then, an input bit (secret key) may be input for postprocessing using the secret key. Further, if an initial value is determined so that the trap bit sequence is output during the output of the predetermined number of bits, the steps performed after the switching of mode will be simplified.

The above described encryption process may be implemented in part by an exclusive OR circuit. If so, input data needs to be prepared so that a bit sequence subjected to the exclusive OR process becomes the true secret key.

It will become more apparent from reading the detailed explanation below that the invention can be carried out by a circuit in semiconductor chip or software or the like.

DESCRIPTION OF THE PREFERRED EMBODIMENTS

Figure 1:
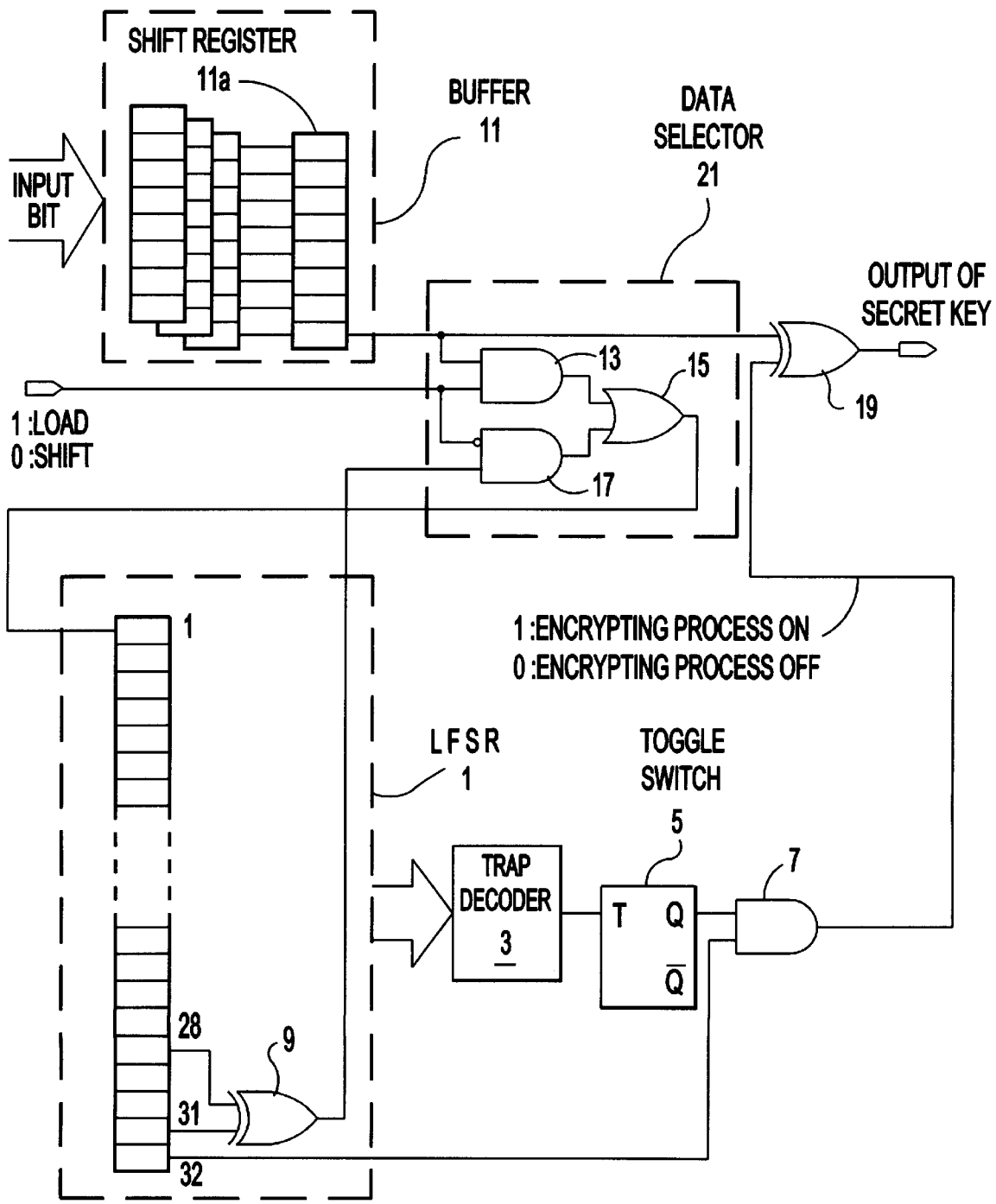
FIG. 1 is a diagram showing the circuit example of the subject invention.

A circuit diagram of the subject invention is illustrated in FIG. 1. A bit sequence to be input is initially stored in a buffer 11. Four registers are prepared in the buffer 11. One register among them is a shift register 11a and a lower bit thereof is connected to an AND circuit 13 and an exclusive OR circuit 19. This construction of the buffer 11 exhibits only an example, so that the buffer is not limited to such a construction. For example, an apparatus may be provided in which a memory storing all of an input bit sequence (secret key) to be processed and an initial bit sequence to be explained below is prepared and stored bits are output one bit by one bit. In addition, since an interface to an external part is 8 bits and an LFSR1 in a postprocessing stage needs 32 bits, the buffer 11 includes four registers of 8 bits. However, since the interface to the external part may have any number of bits and the number of bits of the LFSR1 may not be 32 bits, the construction of the buffer 11 can be changed so as to meet respective conditions. Further, since the buffer 11 may output bits so as to meet the operations of the postprocessings of the LFSR1 and the exclusive OR circuit 19, the number of bits of the buffer 11 may not correspond to that of the LFSR1.

The other input of the AND circuit 13 is connected to an output from a control circuit not shown. Additionally, the output from the control circuit is connected to an AND circuit 17 through a NOT circuit. The other input of the AND circuit 17 is connected to the output of an exclusive OR circuit 9 in the LFSR1. Then, the outputs of the AND circuit 13 and the AND circuit 17 are connected to the input of an OR circuit 15. The output of the OR circuit 15 is connected to the first bit of the LFSR. The respective bits (Herein, only 31 bits are provided. In this case, only bits required by a trap decoder 3 may be provided.) of the LFSR1 are connected to the trap decoder 3. The trap decoder 3 is connected to a toggle switch 5. The output (positive output) of the toggle switch 5 is connected to an AND circuit 7. The other input of the AND circuit 7 is connected to the output bit (herein, 32nd bit) of the LFSR1. The output of the AND circuit 7 is connected to the other input of the exclusive OR circuit 19 so that the secret key is output. The input of the exclusive OR circuit 9 is selectively connected to the stage of the register so that the LFSR1 generates a pseudo random number with very long cycle. In this figure, the inputs of the circuit 9 are connected to the 28th stage and the 31st stage. The AND circuits 13 and 17 and the OR circuit 15 constitute a data selector 21.

Figure 2:
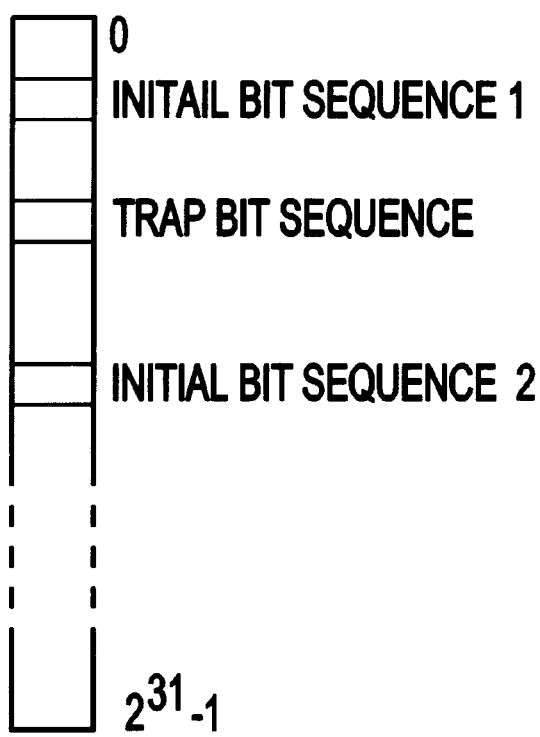
FIG. 2 is an explanatory view for explaining a method for using bit sequences output by an LFSR1.

Before the operation of the circuit illustrated in FIG. 1 is described, the LFSR1 will be described. If the inputs of the exclusive OR circuit 9 are properly selected as mentioned above, the pseudo random number with extremely long cycle is generated. In the case of the LFSR1 having 31 bits, pseudo random numbers are generated with cycles of $2^{31}-1$ (Since the 32nd bit of the LFSR1 illustrated in FIG. 1 is used only for an output, the LFSR1 is an LFSR substantially having 31 bits. Further, when all bits are 0, the LFSR is locked.). Therefore, as illustrated in FIG. 2, if initial bit sequences (for example, initial bit sequences 1 and 2) having 31 bits or more at arbitrary positions are determined among $2^{31}-1$ bit sequences, bit sequences after them can be anticipated. The subject invention uses the above described features.

Now, the operation of the circuit shown in FIG. 1 will be described. Initially, the initial bit sequence of the LFSR1 is loaded. Upon this load, the control circuit not shown sets its output to a logic "1" and holds the output of the AND circuit 17 at a logic "0" (because of use of the NOT circuit), so that the output of the AND circuit 13 is directly input to the first bit of the LFSR1. Thus, the output of the shift register 11a can be immediately input to the first bit of the LFSR1. The buffer 11 outputs the bits of the shift register 11a one bit by one bit.

When the shift register 11a becomes empty, the buffer 11 immediately supplies bits stored in other registers to the shift register 11a at a stroke. This operation is repeated until the LFSR1 is filled with the initial bit sequence.

In FIG. 1, after the LFSR1 is filled with the initial bit sequence having 32 bits, the control circuit not shown sets its output to a logic "0". Then, since one input of the AND circuit 13 becomes a logic of "0", the AND circuit 13 outputs only the logic "0". On the other hand, since the input of the AND circuit 17 becomes a logic "1" (because the NOT circuit is used), the other input of the AND circuit 17 is directly output. Therefore, the output of the exclusive OR circuit 9 which is the other input of the AND circuit 17 is input to the first bit of the LFSR1 through the OR circuit 15. Thus, a state is obtained in which the bit sequence after the initial bit sequence are output by the LFSR1.

Under this state, the trap decoder 3 which monitors 31 bits of the LFSR1 starts its operation. The trap decoder 3 serves to monitor whether the LFSR1 outputs a predetermined trap bit sequence or not. When the trap decoder 3 detects the trap bit sequence, it outputs a switch signal. When the trap decoder does not detect the trap bit sequence, it does not output a switch signal. When the trap decoder 3 outputs the switch signal, the toggle switch 5 inverts the output of itself. Specifically stated, when the trap decoder outputs a logic "0", a logic "1" is output, and when the trap decoder outputs a logic "1", a logic "0" is output. If the initial value of the toggle switch 5 is a logic "1", the output of the AND circuit 7 will be the output of the LFSR1 until the toggle switch 5 receives the switch signal. On the other hand, when the toggle switch 5 receives the switch signal, one input of the AND circuit 7 changes to a logic "0", the output of the LFSR1 is not output from the AND circuit 7.

Accordingly, since the output of LFSR1 becomes one input of the exclusive OR circuit 19 until the trap decoder 3 outputs the switch signal, the output of the shift register 11a is subjected to an exclusive OR process (encrypting process) with a pseudo random number which is the output of the LSFR1. On the other hand, when the trap decoder 3 outputs the switch signal, one input of the exclusive OR circuit 19 is fixed to a logic "0", so that the output of the shift register 11a becomes the output of the exclusive OR circuit 19 as it is.

Now, how the trap bit sequence is to be set will be described below. As stated above, it is necessary to provide a mode for exposing a secret key and a mode for exposing no secret key. According to the mode for exposing the secret key, if the output of the exclusive OR circuit 19 is not the same as that of the shift register 11a, it cannot be said that the secret key is exposed or opened. Therefore, the output of the toggle switch 5 must be a logic "0". Thus, the switch signal needs to be output from the trap decoder 3. Thus, if a bit sequence located at a position shown in FIG. 2 is used as the trap bit sequence, a bit sequence initially located in the LFSR1 as an initial bit sequence must be an initial bit sequence 1. Namely, after the initial bit sequence 1 is input, the LFSR1 may be run idly until the trap bit sequence appears in the LFSR 1, and the secret key may be output from the shift register 11a after the trap bit sequence appears in the LFSR1 and the switch signal is output from the trap decoder 3.

On the contrary, according to the mode for exposing or opening no secret key, an initial bit sequence 2 shown in FIG. 2 may be used as the initial bit sequence to be loaded of the LFSR1. In this case, a trap bit sequence does not exist after the initial bit sequence 2. (Usually, since input data is extremely shorter than the output bit sequence of the LFSR1, it does not return to its original position because of its cyclic characteristic.). Accordingly, since the output of the toggle switch 5 is always set to a logic "1", the output of the LFSR1 is input to the exclusive OR circuit 19. Consequently, the output of the shift register 11a is subjected to an exclusive OR process (encrypting process) with a pseudo random number. Conversely, when the output of the exclusive OR circuit 19 is made significant, an input bit from the shift register 11a needs to be prepared so as to correspond to the output of the LFSR1.

Also, in the mode for exposing or opening no secret key, after the initial bit sequence 2 is loaded on the LFSR1, the LFSR1 may be run idly for predetermined bits and then, an input bit sequence may be output from the shift register 11a. This means that the input bit sequence may be output so as to meet the operating timing of a postprocessing.

The above mentioned example only shows an example of the subject invention, and various deformations may be considered. For example, the LFSR1 may be replaced by other circuit which generates a bit sequence which allows to anticipate a subsequent bit sequence when an initial bit sequence is set. Further, although, in the above embodiment, the trap decoder 3 has such a construction as to inspect the bits in the LFSR1 and output the switch signal, it is also possible that the output itself of the LFSR1 is inspected. Specifically, when the trap bit sequence shown in FIG. 2 is generated in the LFSR1, bit sequences (upper bit sequences in FIG. 2) before the trap bit sequence have been already output from the LFSR1. Therefore, if the output bit sequences are monitored, it may be decided whether the trap bit sequence exists or not in the LFSR1.

Figure 3:
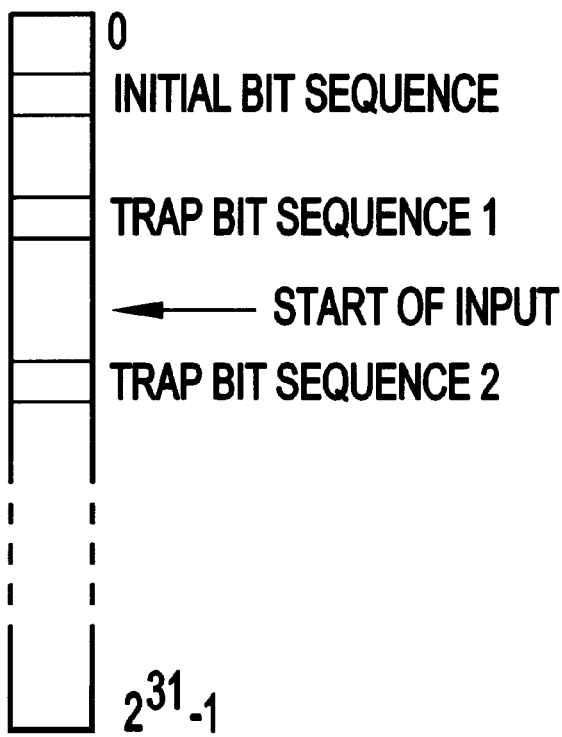
FIG. 3 is an explanatory view for explaining a method for using bit sequences output by the LFSR1.
Figure 4:
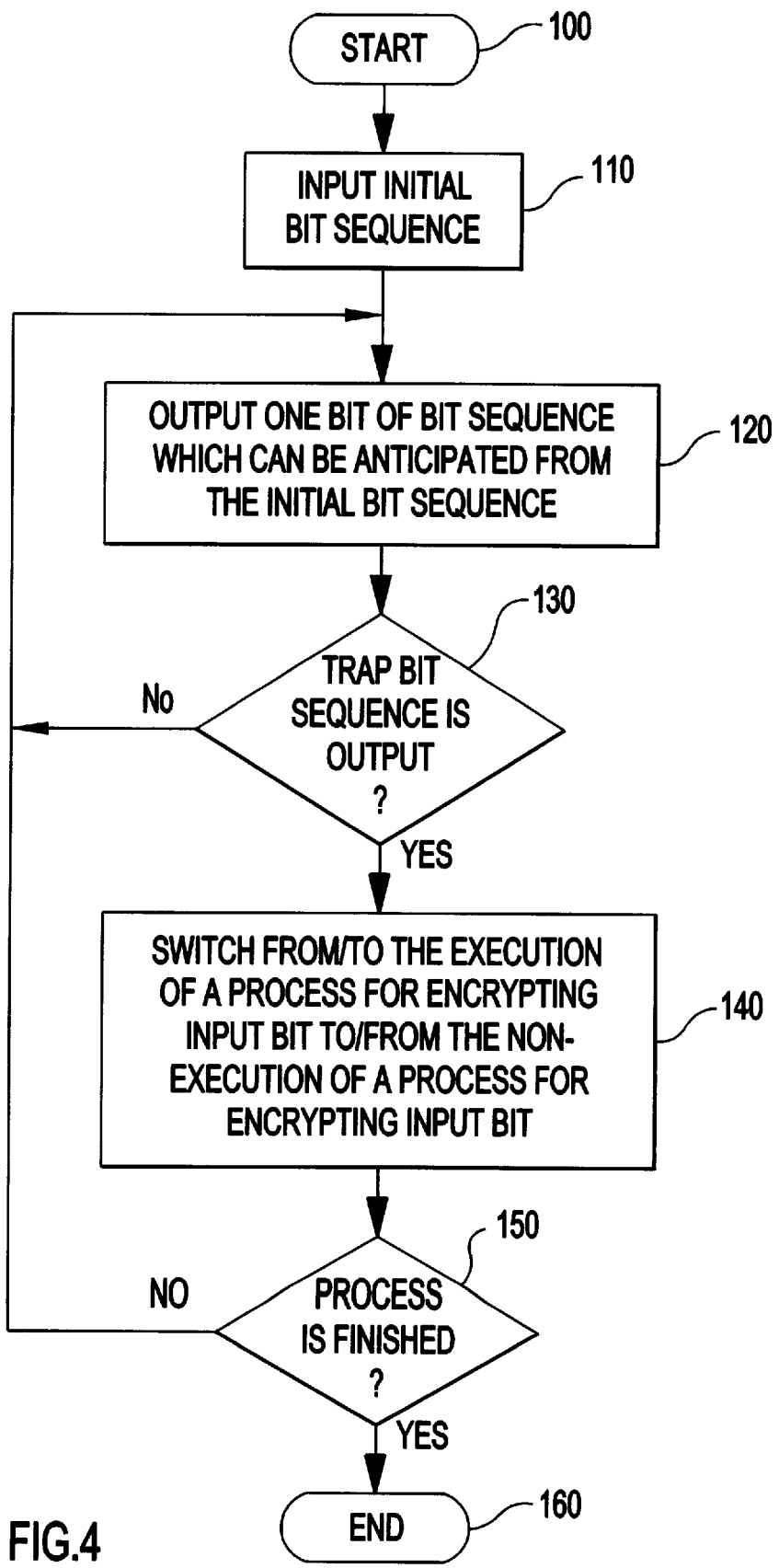
FIG. 4 is a flowchart for explaining the operation of the subject invention.

Although the trap decoder 3 which outputs the switch signal when it detects the trap bit sequence of 31 bits has been shown in the foregoing description, the switch signal may be output only by inspecting the state of predetermined number of bits in the LFSR1, depending on the output bit sequence of the LFSR1. Additionally, not only one trap bit sequence but a plurality of trap bit sequences may be set. For example, when the secret key is not exposed, only a part of it may be exposed or opened and the rest of it may not be exposed. As illustrated in FIG. 3, the encryption of the initial bit sequence is started, and the encryption due to the output of the LFSR1 is temporarily stopped after the trap bit sequence 1. After that, the input of an input bit is started from the shift register 11a. Then, when the trap bit sequence 2 appears, the encryption is started based on the output of the LFSR1. Therefore, the input bit from the shift register 11a is exposed or opened until the trap bit sequence 2 appears. The input bit is exposed during an initial time, but it is not entirely exposed nor opened, so that the operation is more hardly understood and hardly stolen with difficulty. Further, it is to be understood that the number of the trap bit sequence is not limited to one or two. However, if the number of the trap bit sequences is increased, the construction of the trap decoder 3 will be more complicated. Besides, while the LFSR1 is idly run, the switch signal may be output a plurality of times.

As an alternative example, although the controller not shown in FIG. 1 discriminates the load period of the initial bit sequence from the operating period of the LFSR1 depending on the switching of one signal, the circuit may be constructed so that the above described loading period is discriminated from the operating period of the LFSR1 depending on the switching of a plurality of signals. In other words, the data selector 21 may have various kinds of constructions. Further, although the input bit from the shift register 11a is encrypted by the exclusive OR circuit 19, the input bit may be scrambled by a circuit other than the exclusive OR circuit. Still further, although the output of the toggle switch 5 is a logic "1" at its initial value, it is to be understood that the initial value may be set to a logic "0". However, in this case, the mode for exposing the secret key needs to be changed to the mode for exposing no secret key for use.

According to the foregoing description, although the operation for running idly the LFSR1 predetermined times from the initial bit sequence has been described, the LFSR1 may not be run idly. However, there may be considered many cases where the idle-running may be required in order to hardly understand the operation when viewing from the outside, and to have a synchronization with the postprocessing stage.

The above mentioned operations will be briefly stated hereinafter. (1) The initial bit sequence is first input (step 110). (2) The bit sequence which can be anticipated from the initial bit sequence is output one bit by one bit by using the LFSR1 or the like (step 120). (3) It is examined whether the predetermined trap bit sequence is output or not every time of the output of one bit in the preceding step (step 130). When the trap bit sequence is not detected, the steps 120 and 130 are repeated. (4) When the trap bit sequence is detected, the execution for encrypting the input bit is switched to the non-execution for encrypting it (step 140). When the encrypting process is carried out, the process is switched to a non-encryption process, and when the encrypting process is not carried out, the process is switched to the encryption process. This process is repeated until the process is to be completed (step 150). Ordinarily, when there exists no input bit (secret key), the process is finished.

A method and apparatus capable of implicitly performing a mode for exposing a secret key and a mode for exposing no secret key thus has been provided.

Further, a person who tries to steal the secret key can be effectively coped with.

Still further, the secret key can be scrambled by hardware of small scale.

What is claimed is:

1. An apparatus for encrypting an input bit sequence comprising:

a bit sequence output means for outputting a predetermined bit sequence which is derived from an initial bit sequence inputted to the bit sequence output means, the predetermined bit sequence including a predetermined trap bit sequence within the predetermined bit sequence;

means for processing the input bit sequence in a first mode of operation that encrypts said input bit sequence using the predetermined bit sequence and in a second mode of operation that does not so encrypt the input bit sequence;

a switch signal output means monitoring said predetermined bit sequence for detecting said predetermined trap bit sequence and outputting a switch signal upon detecting said predetermined trap bit sequence; and a switch responsive to said switch signal for automatically switching said means for processing to said second mode of operation if said means for processing is in said first mode of operation and to said first mode of operation if said means for processing is in said second mode of operation.

2. The apparatus for encrypting an input bit sequence according to claim 1, wherein said bit sequence output means is comprised of a linear feedback shift register.

3. The apparatus for encrypting an input bit sequence according to claim 1 wherein the predetermined bit sequence is longer than the input bit sequence and the initial bit sequence causes said bit sequence output means not to output said predetermined trap bit sequence during the processing of said input bit sequence by said means for processing.

4. The apparatus for encrypting an input bit sequence according to claim 2, wherein said switch signal output means includes means for judging whether said linear feedback shift register holds said predetermined trap bit sequence or not.

5. The apparatus for encrypting an input bit sequence according to claim 1, wherein said bit sequence output means inputs said input bit sequence after said bit sequence output means outputs a predetermined number of bits.

6. The apparatus for encrypting an input bit sequence according to claim 1, wherein said means for processing is performed by an exclusive OR circuit.

7. The apparatus for encrypting an input bit sequence according to claim 1, wherein said input bit sequence is a secret key.

8. A method for encrypting an input bit sequence, comprising the steps of:

inputting an initial bit sequence and the input bit sequence;

outputting an output bit sequence which is derived from said initial bit sequence bit by bit, said output bit sequence being longer than said input bit sequence and including a predetermined trap bit sequence somewhere within said output bit sequence;

processing an input bit sequence in one of a first mode of operation encrypting said input bit sequence and a second mode of operation not encrypting said input bit sequence;

judging whether said predetermined trap bit sequence is output or not every time when one bit is output in said output bit sequence outputting step; and in said processing step, switching from said first mode to said second mode or from said second mode to said first mode when it is judged that said predetermined trap bit sequence is output, and wherein said processing step encrypts said input bit sequence in said first mode of operation using the output bit sequence.

9. The apparatus for encrypting an input bit sequence according to claim 1 wherein the predetermined bit sequence is longer than the input bit sequence and the initial bit sequence causes said bit sequence output means to output said predetermined trap bit sequence during the processing of said input bit sequence by said means for processing.

10. The apparatus for encrypting an input bit sequence according to claim 1 wherein the predetermined bit sequence is longer than the input bit sequence and the initial bit sequence causes said bit sequence output means to output said predetermined trap bit sequence at least twice during the processing of said input bit sequence by said means for processing.

* * * * *